Sept. 2, 1958 C. VINTEN 2,849,914
FILM DRIVE MECHANISMS IN HIGH SPEED CAMERAS
Filed April 2, 1954 3 Sheets-Sheet 1

INVENTOR:
Charles Vinten
BY
Cushman, Darby & Cushman
ATTORNEYS

Sept. 2, 1958          C. VINTEN          2,849,914

FILM DRIVE MECHANISMS IN HIGH SPEED CAMERAS

Filed April 2, 1954          3 Sheets-Sheet 2

INVENTOR
Charles Vinten

BY
Cushman, Darby & Cushman
ATTORNEYS

Sept. 2, 1958      C. VINTEN      2,849,914
FILM DRIVE MECHANISMS IN HIGH SPEED CAMERAS
Filed April 2, 1954      3 Sheets-Sheet 3

INVENTOR:
Charles Vinten
BY
Cushman, Darby & Cushman
ATTORNEYS

# United States Patent Office 2,849,914
Patented Sept. 2, 1958

2,849,914

FILM DRIVE MECHANISMS IN HIGH SPEED CAMERAS

Charles Vinten, London, England

Application April 2, 1954, Serial No. 420,661

1 Claim. (Cl. 88—18.3)

This invention relates to improvements in the film drive mechanisms of high speed photographic cameras and has particular usefulness in cameras for use in aircraft travelling at high speeds and relatively low altitudes for obtaining photographs of objects on the ground.

In cameras employed in this class of work, the ideal frequency at which the photographs are taken is such that the image recorded on the edge of one photograph overlaps the image on the adjacent edge of the next photograph so that a sequence of such photographs laid edge to edge after suitable trimming forms a substantially continuous photograph. The high speed and low altitude of the aircraft necessitate quite a number of photographs being taken per second if this condition is to be met, and this in turn calls for a comparatively high speed drive. In this connection it should be appreciated that the frame size of each photograph is normally considerably greater than in even the larger calibre cine cameras. The film accordingly passes through the gate at a comparatively high linear speed. Its motion has, of course, to be intermittent, and this intermittent motion has to be obtained from the continuous motion of a motor by some suitable mechanism. The most commonly employed mechanism for achieving this end in projectors is a Geneva movement or "Maltese cross."

In the operation of the conventional form of Maltese cross mechanism, the driven wheel is rotated through a given angle (usually 90°) during engagement of a pin on the driving wheel in a groove of the driven wheel, this movement taking place during rotation of the driven wheel through a minor part of one whole revolution— usually an angle of 90° also. There is then a dwell while the driving wheel rotates through the remainder of one complete revolution, during which time the driving pin is disengaged from the driven wheel. In this case, the driven wheel is rotated during only ¼ of the time taken for the driving wheel to execute one revolution, and is still for the other ¾ of such unit time. It is however locked against movement by the outer periphery of the driving wheel fitting into one of the four arcs of the driven wheel. The film is thus fed forward during the first mentioned ¼ of the unit time and is still during the subsequent ¾. The shutter is operated during this latter dwell period. Since only ¼ of the total time is employed for feeding forward the film, its maximum speed will be high in comparison with its mean speed, and the acceleration and deceleration will also be high. The disadvantages of these characteristics and of the stresses that inevitably accompany them in the gearing and in the film itself, are plainly evident.

These disadvantages may become of prime importance in high speed cameras of the type described above, with the result that the limitation necessarily imposed upon the maximum speed of the film, provides a dwell period that far exceeds the time actually required for operation of the shutter, this effect becoming more pronounced as quicker acting shutters and more sensitive film are developed and employed. The type of shutter described in copending United States Patent application Serial No. 420,663 (British application No. 11,772/53), for example, requires for its operation only a very small portion of the unit period, i. e. the period between successive frames occupying corresponding stages, during which time the driving wheel of the Maltese cross executed exactly one revolution.

It follows that if much of the unused dwell period were dispensed with, the ratio of the maximum speed of the film to the mean speed of the film would be reduced. The mean speed could therefore be increased without the maximum speed and acceleration exceeding that found permissible, or conversely, the design could be simplified as a result of the reduced maximum speed and acceleration without sacrifice in respect of the mean speed.

Accordingly, in its broadest aspect, the invention resides in a drive mechanism for a high shutter speed camera, provided with a device whereby a continuous rotational movement is transformed to an intermittent motion, characterised in that the period of driving is longer than the period of dwell.

In the description which follows, a Maltese cross type of mechanism is described that reverses the time intervals of the conventional Maltese cross in that the dwell occupies only approximately ¼ of the unit period, the driven wheel rotating for approximately ¾ of such period. It will be immediately apparent from the considerations discussed above that the use of this mechanism will greatly reduce the maximum speed and acceleration of the film for a given mean speed of film, i. e. for a given number of frames per second.

A further advantageous feature of the mechanism to be described is that it provides for control of the driven wheel during the dwell period, which leads to improved steadiness of the film at the moment the photograph is actually taken, an important consideration in aerial cameras.

Reference is now directed to the accompanying drawings which illustrate a high speed camera incorporating the features of the invention.

Figure 1:
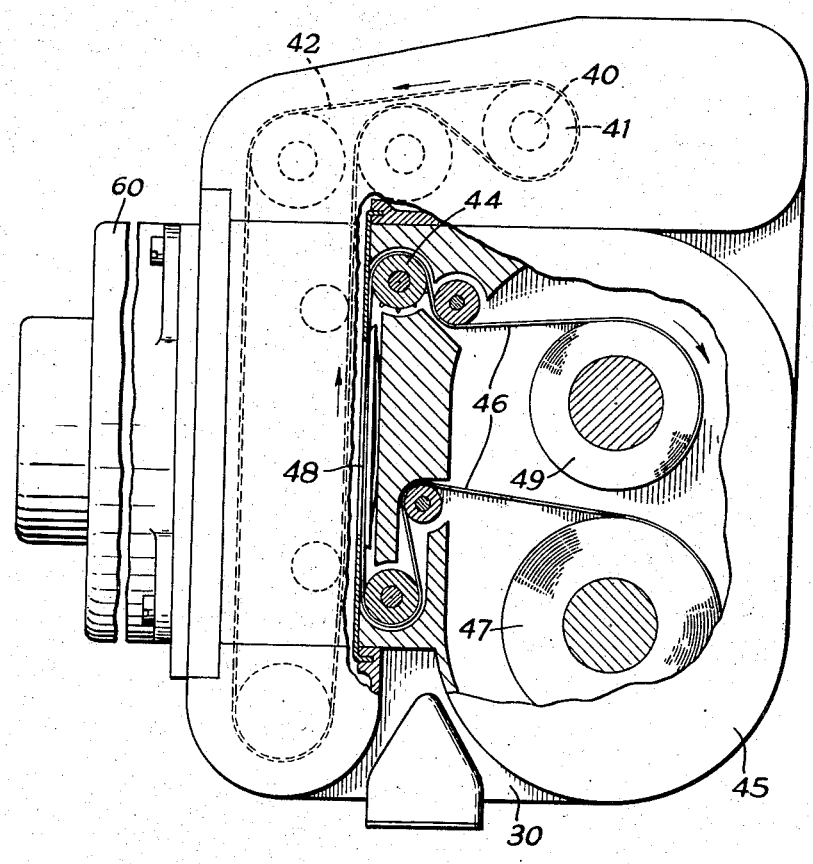
Figure 1 shows a top plan view of the camera with a part of the film magazine cut away and the shutter mechanism illustrated in broken lines.

This special Maltese cross mechanism illustrated in Figs. 3 and 4 will be described first. It consists of a driving wheel 10 and driven wheel 11 mounted to rotate about different parallel axes within a housing, although the axis of the driving wheel 10 is not arranged outside the periphery of the driven wheel 11 as is normally the case with Maltese cross mechanisms. Instead, the driving wheel 10 is mounted to rotate about an axis arranged about mid-way between the centre and the periphery of the driven wheel 11. The two wheels 10 and 11 are arranged face to face so as to coact with one another by means of projections and recesses thereon. The principal cooperating parts on the driven wheel 11 comprise four equally spaced radial slots 15, 16, 17 and 18, the corners where the side of each slot extends into the side of the adjacent slot being convex or rounded off as at 13, about a radius such that a driving pin 14 projecting from the face of the driving wheel 10 can pass smoothly from one radial slot 15 of the driven wheel 11 to an adjacent radial slot 16 thereof, while the same remains stationary. In Fig. 4 the pin 14 is shown halfway through such movement, which takes place during the above-mentioned dwell or non-driving period and involves rotation of the driving wheel 10 through 90°. As the same continues to rotate, so as to move the pin 14 thereon through a path extending generally tangentially to the periphery of the driven wheel 11 although described about a smaller radius, the driven wheel 11 is rotated by the pin 14 while the same slides first outwardly and then, after passing the point where the two radii are coincident (i. e. with the pin 14 in the position diametrically opposite to that shown in Fig. 4), inwardly along the radial slot 16. This action continues for a 270° rotation of the driving wheel 10, i. e. until the pin 14 again encounters a rounded corner 13 as it moves inwardly along the slot 16 and passes into the adjacent slot 17, there to repeat the operation just described. Meanwhile the driven wheel 11 has been rotated through 90°, i. e. to bring the slot 17 around to the position occupied by the slot 16 in Fig. 4.

In addition, further cooperating parts are preferably provided on the driving and driven wheels, that lock the latter during the dwell period. On the driving wheel 10, the locking part takes the form of a short outward facing arcuate or concave surface 19 formed at one end of a horizontal member or raised or horizontal projecting portion 12 arranged on the face of the wheel 10 and described about the centre of such wheel, such surface 19 being diametrically opposite the pin 14 which is mounted on the other end of the projection 12 so that the transverse center of the curved surface 19 is in substantial horizontal alignment with the center of the driving pin 14. The surface 19 is thus situated adjacent the periphery of the driven wheel 11 when the pin is moving from one slot to the other, i. e. during the dwell period shown in Fig. 4. Four circumferentially spaced corresponding short concave arcuate surfaces 20 are provided on projections 21 arranged on the inner periphery of the face of the driven wheel 11, the curvature of each of these concave surfaces 20 being the same as that of the convex surface 19 on the driving member 10 so that the latter surface 19 travels in closely contiguous relationship along one of the former surfaces 20 during the said movement of the pin 14 from slot to slot. This arrangement in no way impedes movement of the driving wheel 10, but as will be appreciated, it effectively blocks any movement of the driven wheel 11 during this dwell period, since such rotation would involve rotation of the concave surface 20 thereon about a centre, i. e. the axis of such wheel 11, other than its own centre of curvature, i. e. the axis of the wheel 10. It will be seen that the coacting concave and convex surfaces 19 and 20 are of uniform length and width and of such dimensions as to provide a substantial area of contact with each other when the driven member 11 is rotated in either a clockwise or counterclockwise direction, sequentially to engage the convex surface 19 with the concave surfaces 20, in order to insure a positive locking engagement of the driving wheel 10 with the driven wheel 11 which is so essential in the efficient operation of high speed cameras.

Figure 3:
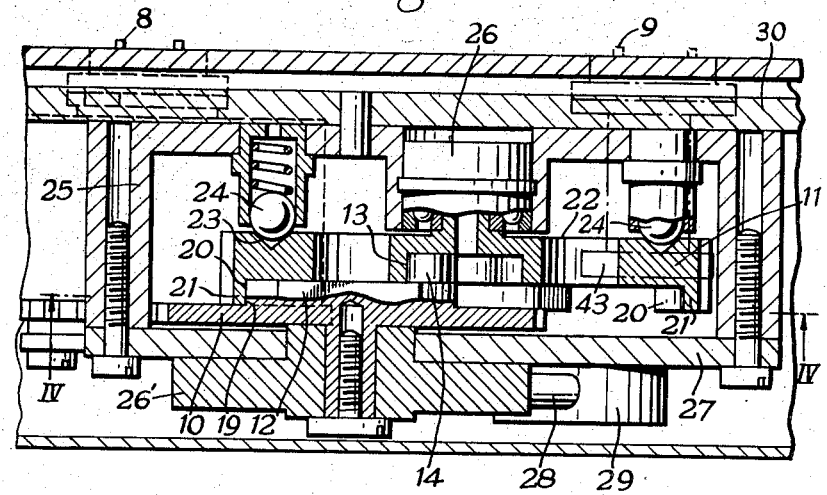
Figure 3 shows a further enlarged view of the Maltese cross mechanism of this camera, taken on the line III—III of Fig. 2.
Figure 4:
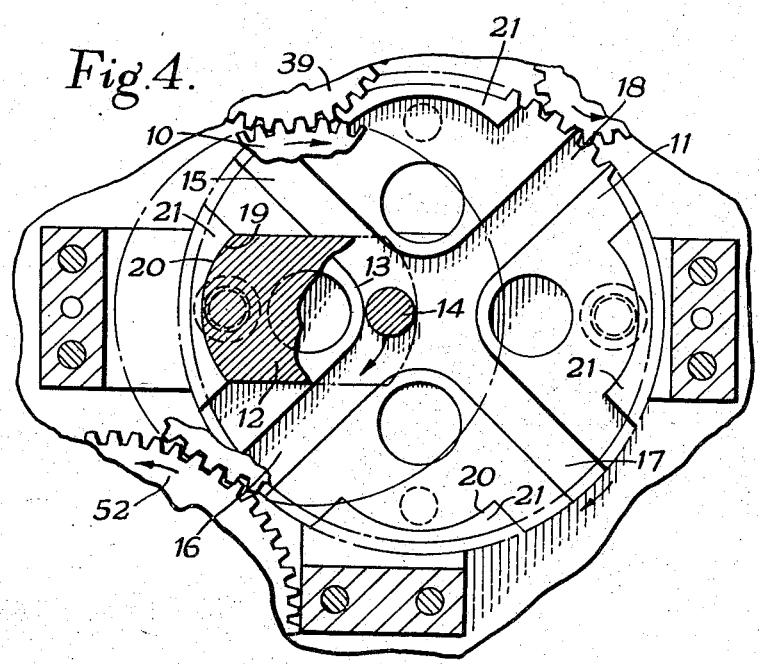
Figure 4 shows an underside fragmentary view of the mechanism seen in Fig. 3, taken principally on the line IV—IV in such figure.

As a further safeguard against accidental movement of the driven wheel 11 during the dwell period, its opposite face 22 may advantageously be provided with four recesses 23 disposed symmetrically around the periphery (see Fig. 3). One or more spring pressed detents, conveniently in the form of balls 24 are arranged on the framework 25 of the mechanism within the housing so as to engage one or more of the recesses 23 and thus tend to check movement of the driven member 11 as the latter comes to a stop at the end of each of its intermittent movements.

The wheel 11 is mounted on suitable bearing means 26 housed in the framework 25, and the wheel 10 is supported in a bush 26' mounted on a plate 27 secured to the framework 25. The bush 26' is also supported by a rod 28 connected to a pillar 29 extending outwardly from the floor 30 of the chassis 31 of the camera.

Figure 2:
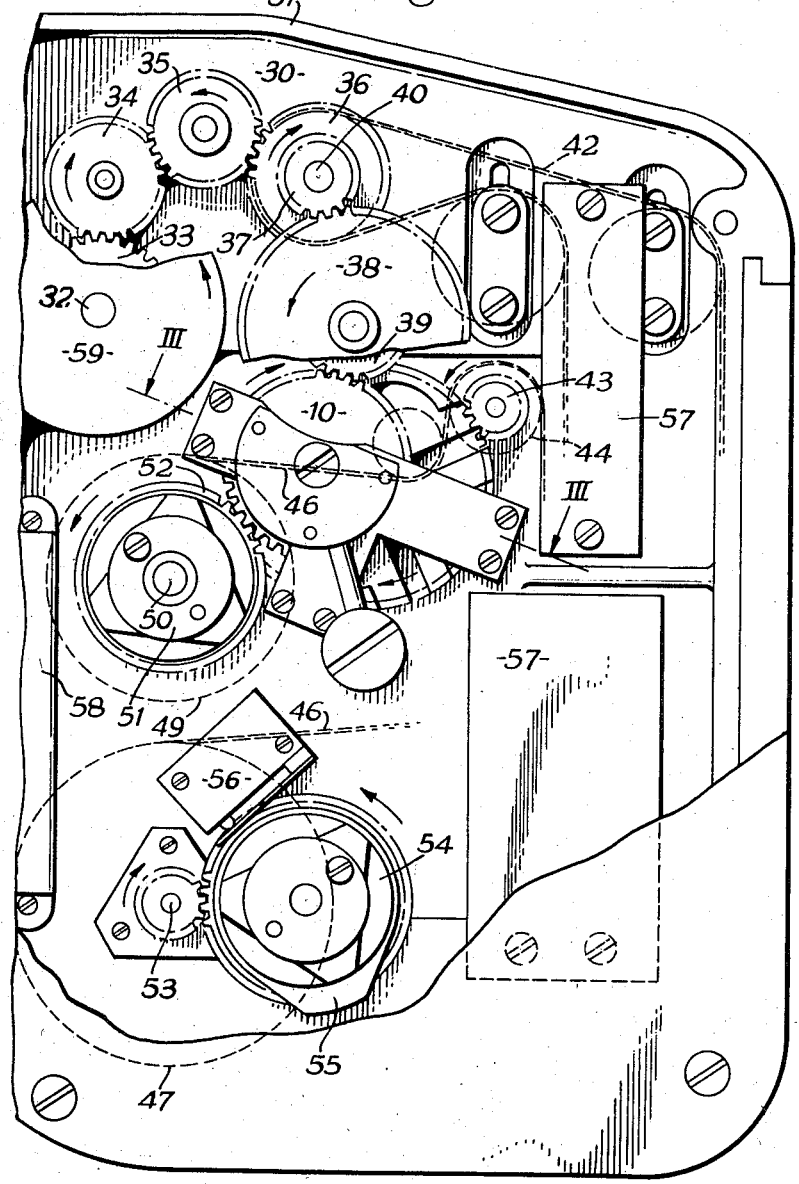
Figure 2 shows a bottom plan view of the chassis of the camera as seen in Fig. 1, on a somewhat larger scale, and with the cover plate partly cut away to reveal the working parts.

The peripheries of both wheels 10 and 11 are toothed to enable them to be interpolated in the drive mechanism of the camera. This drive mechanism, shown in Fig. 2, commences at an electric motor (arranged on the other side of the chassis 31 to that shown in Fig. 2, its spindle 32 extending through the floor 30 thereof) and extends through a reduction gear train 33 to 39 to the driving wheel 10 of the Maltese cross. From the spindle 40 of gear wheels 36, 37 a connection is established to the driving sprocket wheel 41 of a shutter 42, such as that described in the said copending application (see also Fig. 1). The intermittent movement of the driven wheel 11 of the Maltese cross is transmitted via a pinion 43 (Fig. 2) and a spring dog drive 9 (Fig. 3) to a film sprocket 44 in the film magazine 45 (Fig. 1), the film 46 passing from the feed-off spool 47 across the exposure aperture 48, then immediately around the sprocket 44 so that the piece of film at the aperture 48 is moved picture by picture spacing across it. After leaving the sprocket 44 the film 46 passes to the take-up spool 49 in the magazine 45 which is continuously driven through a spring dog drive 8 (Fig. 3) connected to a spindle 50 (Fig. 2) coupled through a friction clutch 51 to a spur wheel 52 meshing with the continuously turning driving wheel 10 of the Maltese cross. The friction clutch 51 allows the take-up spool 49 a degree of freedom of motion, and acts as a slipping clutch to check any tendency of such spool to wind the film too tightly.

A third spring dog drive (not visible) is provided projecting slightly from the upper surface of the floor 30 of the chassis 31 of the camera, to engage the feed-off spool 47. The spindle 53 of this latter spring dog drives a cam 54 the rise 55 on which is arranged to operate a small counting mechanism 56 situated within the chassis 31 and arranged for electrical connection to the pilot's instrument panel of an aircraft in which the camera is employed.

The apparatus housed beneath the chassis 31 is completed by electric heating elements 57 and a thermostat 58 controlling the same, and a centrifugal governor mechanism 59 of conventional design coupled to the motor spindle 32 to ensure a constant speed. This governor preferably has two spring loaded weights for making and breaking contact under the centrifugal action of the rotating spindle, the circuit chosen depending on the speed at which it is desired that the camera should run, e. g. 4 or 8 pictures per second.

Further details of the construction and operation of the shutter mechanism and of the iris and lens assembly (shown generally at 60 in Fig. 1) that it is preferred to employ with the other parts of the camera just described are given in copending United States Patent applications Serial No. 420,663, and Serial No. 420,662, respectively (British applications No. 11,772/53 and 11,774/53 respectively).

I claim:

A high shutter speed camera having in combination, a framework having spaced wall means, Geneva movement means within the framework for imparting a uniformly intermittent movement to a film strip at a slow rate of film change so as to relieve stress on the film, said means including driven wheel rotatably mounted on a first of said wall means and having a plurality of symmetrically disposed radially extending slots in one face thereof, a driving wheel rotatably mounted in a second of said wall means about an axis parallel to the axis of the driven wheel, said driving wheel having a raised horizontal portion provided with an outer arcuate convex end surface and a driving pin extending outwardly and laterally from the opposite end thereof, said driving pin being sequentially engageable with said slots, said driving wheel having on its inner periphery circumferentially spaced horizontal projections, each of said projections having a concave surface sequentially engageable with the convex surface on the driving wheel, said concave and said convex surfaces being of such dimensions as to provide a substantial area of contact with each other so as to provide positive locking engagement of the driving wheel with the driven wheel during the dwell period, said driven wheel having an outer surface spaced from said first wall means and provided with circumferentially spaced recesses, and spring-pressed detents connected to said first wall means and releasably engageable with said recesses for checking the movement of the driven member as the latter comes to a stop at the end of each of its intermittent movements and co-acting with said concave and convex surfaces to insure the film remaining motionless during the exposure thereof.

References Cited in the file of this patent

UNITED STATES PATENTS

| | | |
|---|---|---|
| 1,003,536 | Spinks | Sept. 19, 1911 |
| 1,074,362 | Holst | Sept. 30, 1913 |
| 1,089,762 | Guilbert | Mar. 10, 1914 |
| 1,168,086 | Maggard | Jan. 11, 1916 |
| 1,198,683 | Victor | Sept. 19, 1916 |
| 1,268,750 | Menard | June 4, 1918 |
| 1,725,944 | Thompson | Aug. 27, 1929 |
| 1,856,390 | Kelly | May 3, 1932 |
| 2,124,213 | Shackleton | July 19, 1938 |
| 2,415,390 | Konkle | Feb. 14, 1947 |